Feb. 13, 1962 P. L. HYATT 3,020,976
AIR FILTER CONTROL UNIT
Filed Dec. 31, 1957
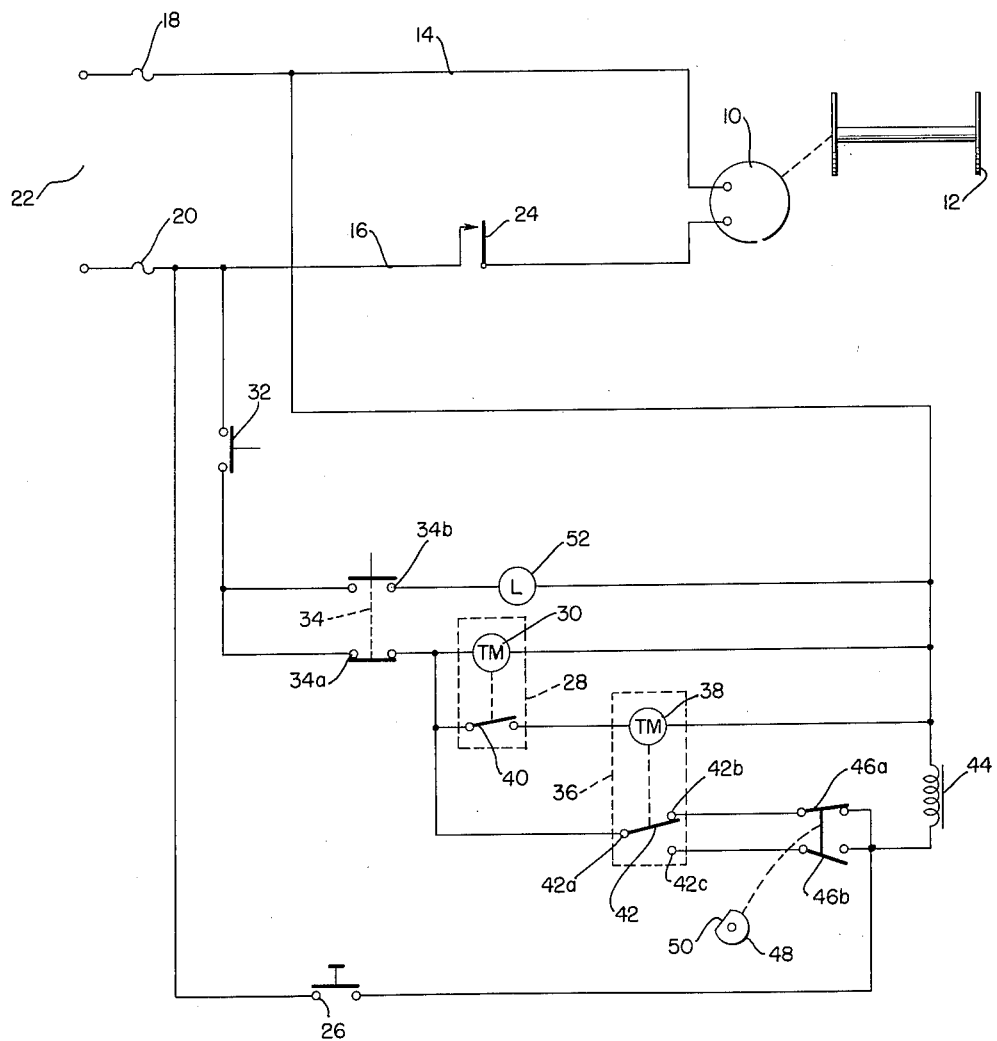
INVENTOR.
PHILIP L. HYATT
BY W.D. Keith
ATTORNEY

United States Patent Office 3,020,976
Patented Feb. 13, 1962

3,020,976
AIR FILTER CONTROL UNIT
Philip L. Hyatt, Bryan, Ohio, assignor to American Air Filter Company, Inc., Louisville, Ky., a corporation of Delaware
Filed Dec. 31, 1957, Ser. No. 706,490
7 Claims. (Cl. 183—62)

This invention relates generally to automatic air filters of the type wherein a web of expansible-compressible filter medium is removed from a compressed condition in a supply zone and is advanced across an air filtering zone in substantially expanded condition entirely by tension on the delivered medium and is related particularly to an improved control mechanism for controlling the rate of advance of the expanded medium across the air filtering zone.

Air filtering apparatus of the general type described wherein advance of the web of filter medium across the air filtering zone is effected entirely by tension on the delivered material is disclosed in the co-pending application of Robert Palmore, Serial No. 699,375 filed November 27, 1957, and also in another copending application of said Robert Palmore, Serial No. 699,374, also filed on November 27, 1957, and cross-referenced in and to said first mentioned Palmore application. In apparatus of this general type, the extent of the air filter zone is a function of the height and width of the filter opening and, assuming a constant width, the area will vary as the height. Utilization of a web of filter medium permits removal of used medium from and introduction of new medium into, the air filtering zone. The rate of feed of the web of filter medium is extremely low, usually in the order of inches per week. The filter medium is preferably incrementally advanced across the air filtering zone and economic considerations dictate a rate of advance that assures efficient utilization of the exposed filter medium. Conventional apparatus, wherein web advance is effected through conveyor displacement and not through rewind tension, accomplishes this desired result by periodically energizing the drive system for equal periods and at regularly spaced time intervals. However, such a control system is inefficient, and, therefore, economically unsatisfactory in apparatus wherein web advance is effected solely by the rewind tension. In such type of filter medium drive system, the amount of lineal advance of the web across the air filtering zone is a function of the amount of rotational displacement of the rewind spool and the effective diameter thereof, which is determined by the depth of used filter medium wound thereon.

This invention may be briefly described as a web advance control mechanism for tension driven filtering apparatus having a time controlled drive actuating means in combination with an overriding control means responsive to the lineal amount of web advance.

The object of this invention is the provision of improved means for controlling the rate of web advance in tension driven filtering apparatus.

Other objects and advantages of the invention will be set forth in the following specification and claims and in the accompanying drawings which illustrate, by way of example, the presently preferred embodiment incorporating the principles of this invention.

Referring to the drawings, the sole figure is an electrical circuit diagram of the presently preferred embodiment of a control device embodying the principles of this invention.

Referring to the drawings; there is provided a rewind spool drive motor 10 suitably connected to effect the direct drive of a rewind spool 12 of an air filtering apparatus of the type herein of particular concern. Current for the motor 10 is supplied through a pair of leads 14 and 16 connected, through protective fuses 18, 20, to a power source generally designated 22. Included in the line 16 is an automatically operable switch member 24 preferably constituted of a normally open relay contact assembly. As illustrated, the power circuit for the rewind spool drive motor 10 is normally open and will be completed, with consequent energization of the motor and rotation of the rewind spool 12 by closure of the relay contacts 24.

The novel control circuit forming the subject matter of this invention may be conveniently connected across the lines 14 and 16 intermediate the protective fuses 18, 20, and the relay contact assembly 24. As illustrated, it includes a first repeating cycle timing unit, generally designated 28, having the timing mechanism 30 thereof connected across the lines 14 and 16 through a normally open fan interlock switch 32 and the normally closed contacts 34a of a filter medium runout switch 34. The timing unit 28 is of conventional construction and a preferred unit is a repeating cycle timer such as timer 3TSA14AW112 as manufactured by the General Electric Company. A second repeating cycle timing unit 36 is connected in cascade with said first timing unit 28, with its timing mechanism 38 connected across the lines 14 and 16 through said normally open fan interlock switch 32, said normally closed contacts 34a of said filter medium runout switch 34 and a single pole switch 40 included in said first timer unit 28 and operably controlled by the timing mechanism 30 thereof. The second timing unit 36, which is also of conventional construction, suitably General Electric Company's timer 3TSA14, includes a self-contained single pole double throw switch 42. The common switch terminal 42a thereof is also connected to the line 16 through said normally open fan interlock switch 32 and the normally closed contacts 34a of the filter medium runout switch 34. The terminal 42b is connected to the line 14 through the energizing coil 44 for the relay contact assembly 24 and through a switch member 46a. The other terminal 42c of the switch 42 is connected to the line 14 through said relay energizing coil 44 and through a switch member 46b which is suitably ganged to the above-described switch member 46a in such manner that when switch 46a is open, switch 46b is closed and vice versa. The switch members 46a and 46b are arranged to be mechanically actuated by a cam member 48 having a flat 50 on the surface thereof. The cam 48 is preferably arranged to be rotatably displaced in accordance with the amount of lineal advance of the filter medium from the supply roll, which may be conveniently effected by means of a metering member, such as a star wheel or fluted roller arranged to be compressively engaged against the surface of the advancing filter medium and to be rotatably displaced in accordance with the lineal advance thereof.

In operation of the components of the control unit described above, the relay contact assembly 24 is normally open. The fan interlock switch 32 is normally open and is of such character as to be automatically closed when the filter apparatus fan, not shown, which serves to induce a flow of air through the air filtering zone is put into operation. The employment of such a fan interlock switch 32 in the described control circuit assures time accumulation on the timer units only during operation of the filter apparatus and thereby contributes to the efficient utilization of the filter medium employed. The switch section 34a of the filter medium runout switch 34 is normally maintained closed as long as more than a predetermined amount of unused filter medium is available on the supply roll. This switch member is mechanically actuated so as to open the contacts 34a and to close the associated contacts 34b whenever the depth of filter medium wound upon the supply roll falls below a predetermined amount.

The runout switch may be conveniently in the form of a microswitch actuated by pivotally mounted arm member positioned to ride against the surface of compressed web on the supply roll. The displacement of the arm member as the depth of compressed filter medium on the supply roll decreases may be readily employed to effect the desired actuation of the runout switch whenever the depth of medium on the supply roll falls below a predetermined value. The timing mechanism 30 in the first timing unit 28 is pre-set so that the switch 40 thereof will be closed for a predetermined portion of its operative cycle. In a particular embodiment, and by way of an illustrative example adapted to assure utilization of a roll of filter medium for a minimum of five hundred hours of continual operation, it has been found desirable to preset the first timing mechanism so that the switch member 40 is maintained closed for a period of about twenty six seconds during each operative cycle of twelve minutes duration. The closure of the switch 40 completes the circuit for the timing mechanism 38 in the second timing unit 36. The timing mechanism 38 of the second timer unit 36 has, in the described example, an operative cycle of one hour. Therefore, after the "on" cycles i. e., the periods of closure of switch 40 for the No. 1 timer have accumulated to equal one hour, the number two timer mechanism 38 will have completed one operative cycle. The second time unit 36 includes, as illustrated, a single pole double throw switch 42. The switch 42 is mechanically controlled by the timing mechanism 38 of the second timer unit 36 so that the position of switch 42 is changed at every half cycle that is, during one-half hour of the operating cycle for the second timing mechanism 38, the switch 42 will be disposed in electrical engagement with the contact 42b and during the other half hour of the one hour cycle, it will be disposed in electrical engagement with the contact 42c.

The switch 46 is, as described above, operably responsive to the amount of lineal advance of filter medium from the supply roll. In the particular example, a metering wheel having a circumference of six inches rides against the surface of the supply roll. As the metering wheel revolves, the cam 48 rotates in conjunction therewith, and actuation of the switch 46 is effected by means of the flat 50 on the cam 48. The switch 46 is thus responsive to the amount of lineal advance of the filter medium and serves as an overriding control on the energization of the relay coil 44. Consequently, the completion of the circuit through the relay energizing coil 44 is determined in part by the particular disposition of the switch member 42, and in part by the disposition of the switch member 46.

In actual operation, assuming switch 46a to be closed and switch 46b to be open, current will flow through the energizing coil 44 when the timing mechanism 38 completes the circuit through switch point 42b. Relay contacts 24 will then be closed and the drive motor 10 energized to advance the filter medium. The advance of the filter medium will result in rotation of the cam 48 and, after a predetermined advance of filter medium has been effected, in an opening of switch 46a and a closure of switch 46b. The opening of switch 46a will break the circuit for the energizing coil 44 and its consequent de-energization of the coil, opening of contacts 24 and de-energization of the drive motor 10. The motor 10 will remain de-energized until the timing mechanism 38 completes a full half cycle of operation and effects the completion of the circuit through the closed switch 46b by shifting of the moveable arm of the switch 42 to the switch point 42c. The completion of the circuit through switch 46b will result in energization of the coil 44, closure of contacts 24 and in energization of the drive motor 10 with consequent web advance. The web advance, as above described will effect rotation of cam 48 and in automatic opening, after a predetermined amount of web advance, of switch 46b and closure of switch 46a. The opening of switch 46b will open the energizing circuit for the coil 44 with its consequent opening of contacts 24 and cessation of energization of the drive motor 10. The periods of closure for the switches 46a and 46b may be readily controlled by the shape of the cam 48 and the dimensions of the metering wheel connected thereto and such periods of closure are determinative of the amount of lineal advance of the web that is effected during each energization of the coil 44.

In the illustrative example, the cam 48 is proportioned so that displacement of the flat 50 past the follower is effected by one inch of displacement of filter medium. This means that the medium will be advanced in sequential alternate increments of 5 inches and one inch respectively. However, it will be apparent to those skilled in the art that the desired time cycles for the first and second timer units and the desired operating cycle for the switch 46 may be varied and will be preselected for any given length of filter medium and desired operating life thereof.

The illustrated circuit also includes the normally open run out switch contacts 34b disposed in series with an indicating lamp 52 or other attention arresting warning device. As described earlier the media run out switch will be automatically operated when the depth of filter medium on the supply roll falls below a predetermined value. When such occurs switch contacts 34b are closed completing the circuit through the indicating lamp 52 and switch contacts 34a are opened with a consequent de-energization of the entire control circuit as described above. The lighting of the indicating lamp 52 provides a visual indication of the need to replenish the supply of filter medium. In order to permit manual actuation of the relay contacts 24 a normally open and manually closable switch is connected across the lines 14, 16 in series with the relay energization coil 44. Manual operation of switch 26 permits manual control of filter medium advance such as the winding of the remainder of the unused filter media on the rewind spool 12 in order to clear the apparatus for installation of a new supply roll of unused filter media.

Having thus described my invention, I claim:

1. A web advance control system for air filter apparatus wherein advance of a web of filter material from a supply thereof through an air filtering zone is effected by rewinding said material on a rewind spool in a discharge zone comprising a motor for rotating said rewind spool upon energization thereof, an electrical energizing circuit for said motor, a normally open switch member included in the energizing circuit for said motor, actuating means for controlling the closure periods for said switch member operatively responsive to satisfaction of two conditions, first condition satisfying means for said actuating means operatively responsive to the passage of predetermined amounts of operating time and second condition satisfying means for said actuating means operatively responsive to predetermined amounts of lineal advance of said filter medium whereby advance of said filter medium is effected independent of the depth of filter material upon said rewind spool.

2. A web advance control system for air filter apparatus wherein advance of a web of filter material from a supply thereof through an air filtering zone is effected by rewinding said material on a rewind spool in a discharge zone comprising a motor for rotating said rewind spool upon energization thereof, an electrical energizing circuit for said motor, normally open switching means included in the energizing circuit for said motor, actuating means for said switching means, a first electrical circuit connecting said actuating means in series with a first switch member, a second electrical circuit connecting said actuating means in series with a second switch member, a third switch member for effecting the selective completion of said first and second electrical circuits across a power source, means responsive to passage of predetermined amounts of operating time of said filter apparatus for actuating said third switch member to effect the selected completion of said first and second electrical circuits, means ganging said first and second switch members for simultaneous selective operation and means responsive to predetermined amounts of lineal advance of filter material for selectively and alternately closing said ganged first and second switch members, whereby repetitively uniform advance of filter material is sequentially effected independent of the depth of filter material upon said rewind spool.

3. A web advance control system for air filter apparatus wherein advance of a web of filter medium from a supply thereof through an air filtering zone is effected by rewinding said material on a rewind spool in a discharge zone comprising a motor for rotating said rewind spool upon energization thereof, an electrical energizing circuit for said motor, a normally open switch member included in the energizing circuit for said motor, means responsive to the passage of predetermined amounts of operating time for closing said switch member to effect energization of said motor and consequent advance of filter medium and means responsive to predetermined amounts of lineal advance of filter medium for opening said switch member subsequent to closure thereof by said last mentioned means to limit the amount of filter medium advance effected by each energization of said motor.

4. In an air and gas filter having a roll for winding a filter curtain thereon, means for driving said roll, means comprising a rotatable member in contact with said curtain and driven thereby for metering the amount of curtain advanced to said roll and being movable simultaneously with said advancing curtain, and means for controlling said driving means in dependence upon the movement of said metering means.

5. In an air and gas filter having a roll for winding a filter curtain thereon, means for driving said roll, including a motor and a power circuit therefor, means for metering the amount of curtain advanced to said roll and movable simultaneously with said advancing curtain, said metering means comprising a rotatable member in contact with said curtain and driven thereby, and a switch in said circuit controlled by said metering means for interrupting and establishing the circuit to said motor.

6. In an air and gas filter having a roll for winding filter curtain thereon, means for driving said roll, including a motor and a power circuit therefor, rotatable means for metering the amount of curtain advanced to said roll and driven by said advancing curtain, a cam attached to said metering means and a switch in said circuit controlled by said cam for interrupting and establishing the circuit to said motor.

7. An automatically controlled air and gas filter having a movable filter curtain, a roll for advancing said curtain, a metering means driven by said advancing curtain, said metering means comprising a rotatable member in contact with said curtain, means for driving said roll including a motor and a power circuit therefor, a time actuated switch in said circuit for starting said motor at predetermined intervals of time, and a switch in said circuit actuated by said metering means for stopping said motor after advancement of a predetermined amount of filter curtain.

References Cited in the file of this patent
UNITED STATES PATENTS

| | | |
|---|---|---|
| 1,780,380 | Durdin | Nov. 4, 1930 |
| 2,177,083 | Sykes | Oct. 24, 1939 |
| 2,516,680 | Culpepper | July 25, 1950 |
| 2,626,012 | Persons | Jan. 20, 1953 |
| 2,687,173 | Loft | Aug. 24, 1954 |
| 2,848,064 | Gregory et al. | Aug. 19, 1958 |
| 2,963,112 | Cawthon | Dec. 6, 1960 |